Patented Aug. 8, 1939

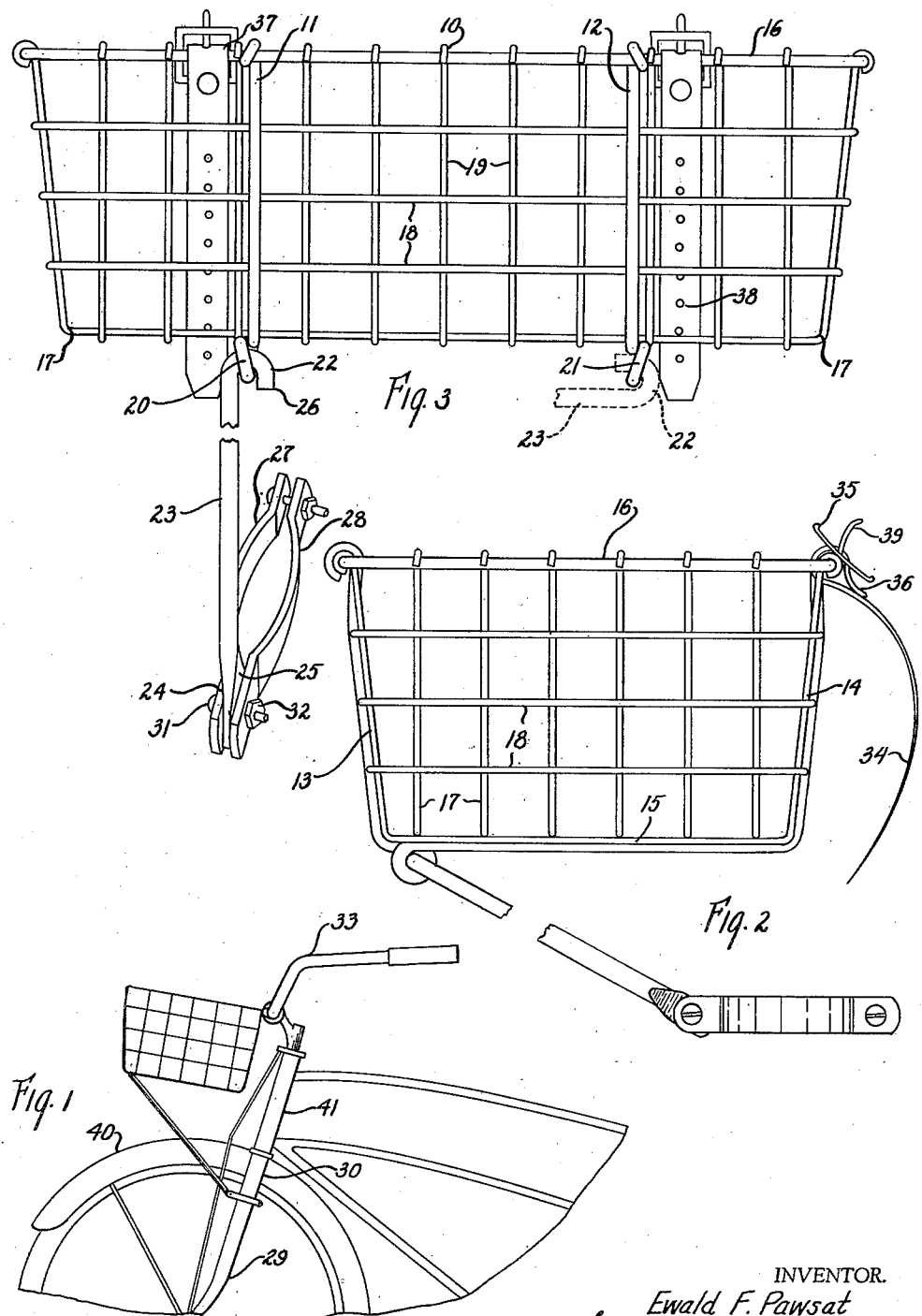

2,168,916

UNITED STATES PATENT OFFICE 2,168,916

BICYCLE BASKET MOUNTING

Ewald F. Pawsat, Maysville, Ky., assignor to Wald Mfg. Co., Inc., Maysville, Ky., a corporation of Kentucky Application September 17, 1937, Serial No. 164,357

1 Claim. (Cl. 224—41)

Heretofore it has been common to mount wire baskets and the like on bicycles, especially adjacent the front wheel and handle or steering bars. Various devices for so attaching such carriers or baskets are of makeshift character and are in the main objectionable for various reasons. By reason of the fact that there is no uniform practice of bicycle owners in attaching horns, bells, lamps and the like to the handle bars, the steering post, the mud guard over the front wheel, and the like, the attaching of carriers or baskets has been more or less makeshift as mentioned.

One of the disadvantages of most methods of attachment of carriers has been that the carrier has been unsupported except immediately adjacent the handle bars, with the result that the carriers vibrate and often the articles in the carrier are broken and in some instances hurled or jostled out of the carrier.

An object of this invention is to provide mounting or attachment means for carriers, ordinarily in the nature of wire baskets, whereby the carrier may be substantially mounted and supported throughout, and which attachment means will permit adaptation for providing such rigid and substantial mounting regardless of the various factors such as lamps, horns or the like that may be mounted at various places as previously indicated.

Another object is to provide means of the character indicated and which are simple of manufacture and attachment and which will obviate the objections previously mentioned.

Another object is to provide means of the character indicated that may be made and sold within a price range that is within the means of persons who are users, largely by necessity, of such vehicles and appliances.

These and other objects are attained by the means described herein and disclosed in the accompanying drawing, in which:

Fig. 1 is a fragmental side view of a bicycle having mounted thereon a device embodying the invention.

Fig. 2 is an enlarged side view of the attachment means, forming details of the invention, and applied to a carrier of the basket type.

Fig. 3 is a front view of the parts shown in Fig. 2.

The wire basket or carrier 10 may be the conventional carrier or basket. A pair of heavy, U-shaped preferably round, bars 11 and 12 extend over the front, rear and bottom walls, 13, 14 and 15 respectively of the basket. The ends of the bars 11 and 12 are curled around the top wire or bar 16 encircling the top or mouth of the basket. The bars 11 and 12 are preferably spot welded at intervals to the various wires or bars such as 17 that extend transversely of and form part of the bottom of the carrier. The bars 11 and 12 are also preferably similarly welded to the wires or bars such as 18 and which extend horizontally along the upturned portions of transverse bars 17 and the upturned ends of longitudinally extending bars or wires 19.

Each of the main support bars 11 and 12 are formed into loops 20 and 21. These loops or eyes are disposed at the front and bottom edge of the basket or carrier and each loop is adapted to receive the curved or hooked end such as 22 of a support bar 23. The diameters of the support bars 23 and of the openings in the loops or eyes 20 and 21 are such that the support bars have a snug fit in the loops. The hooked ends of the support bars require that the bars 23 be moved or turned about the centers of the hooks or rounded ends of the bars 23 for introducing the free or hooked ends of the bars 23 into the loops 20 and 21. The other or lower ends of the main support bars 23 are preferably flattened on opposite sides as shown at 24 and 25, so as to dispose one of the flattened faces thereof on the same side of the bar with the hooked end 26 thereof. Upon each of the flattened faces of the support bar is positioned one member of a clamp. The two clamp members 27 and 28 together form a clevis or clamp for attaching or mounting the lower end of the support bar to one of the prongs 29 of the bicycle fork 30. Suitable bolts 31 and nuts 32 cooperate with the bar 23, and clamp members 27 and 28 for effecting the indicated connection and mountings.

At the rear wall 14 of the basket or carrier 10, suitable means are provided for attaching the upper bar 16 or any of the other horizontal bars such as 18, to the handle bars 33 of the bicycle. Such means may comprise straps 34 of leather or similar material, together with suitable buckles 35 or the like for accomplishing the desired connection. As shown herein, the end 36 of each strap is looped around the bar 16 of the carrier and the cross bar 37 of the buckle frame and is secured by a rivet or the like upon the adjacent strap portion. The free end of the strap is provided with apertures 38 for receiving the pivoted catch 39 of the buckle. The free end of the strap encircles a handle bar and is secured by the buckle in a well known manner.

It is to be understood that a support bar 23 is attached to each prong or leg of the fork 30.

By reason of the attachment of the lower forward wall of the basket to the fork 30 by a substantially rigid connection, the forward portion of the carrier is precluded from movement independent of the movement of the fork, and thus, by eliminating the independent movement or vibration of the forward end of the carrier, the carrier is not subject to the type of vibration that has been responsible for articles being hurled from the carrier when the vehicle is in motion. By reason of the transfer of the bulk of the load of the carrier to the fork, little or no weight is directed upon the connection to the handle bars. For this reason, the rear lower edge of the basket may be attached to the handle bars, should it be desired to mount the basket in a higher plane to accommodate any lamps, horns or the like that may be mounted adjacent the fender 40 or the steering post housing 41. The connections between the carrier, support bars 23, clamps 27—28 and fork 30 permit ready adjustment of the various parts to provide the desired rigid mounting, accommodating the said parts and connections to various appendages and appliances that may be mounted on the vehicle.

By reason of the hooks 22 formed on the support bars, and the fact that the bars must assume substantially the dotted line position shown in Fig. 3, in order to connect and disconnect the bars and carrier, there is no danger of separation of the carrier and support bars when assembled.

It is obvious that the lower ends of the support bars 23 may be attached to any portion of the movable steering column comprising the handle bars, fork, front axle, mud guard or the like, and by referring to the fork, that term is used to generically designate any portion of the movable parts referred to. Accordingly, it is to be understood that use of the clamps may be obviated by making the support bars long enough to dispose the openings in the lower ends thereof, in position to receive the front axle or spindle of the bicycle.

What is claimed is:

A carrier for application to the handle bar structure and the fork elements of a cycle, said carrier comprising a basket having a bottom, side walls, and end walls, a circumferential frame element defining the top opening of the basket, a pair of spaced brace wires each having opposite ends and an intermediate portion, corresponding ends of each brace wire being anchored to the frame element at the opposite side walls of the basket, with the intermediate portion of each brace wire slung beneath the basket bottom in close proximity therewith, said intermediate portions each being turned upon itself to provide a closed loop adjacent to the basket bottom and in substantial parallelism with an end wall of the basket, and a pair of support bars each having an end for attachment to a fork element of the cycle, and an opposite end including a substantially semi-circular open hook insertable in and removable from its associated loop by disposition of the support bar to a position of substantial parallelism with the basket bottom.

EWALD F. PAWSAT.